United States Patent [19]
Sibbitt et al.

[11] Patent Number: 5,065,392
[45] Date of Patent: * Nov. 12, 1991

[54] NETWORK CONTROLLER SCHEDULING SYSTEM AND METHOD OF OPERATION

[75] Inventors: Marcille Sibbitt, Kensington, Calif.; Dowell Stackpole, Springtown, Tex.

[73] Assignee: DSC Communications Corporation, Plano, Tex.

[*] Notice: The portion of the term of this patent subsequent to Jun. 19, 2007 has been disclaimed.

[21] Appl. No.: 507,594

[22] Filed: Apr. 10, 1990

[51] Int. Cl.$^5$ .................. H04Q 11/00; H04M 3/22
[52] U.S. Cl. .................. 370/58.2; 370/58.1; 370/62; 379/13; 379/54; 379/92; 379/112; 379/114; 358/84; 340/825.03; 340/825.06
[58] Field of Search .............. 370/53, 58.1, 58.2, 370/58.3, 60, 60.1, 62, 66, 67, 68.1, 77, 79, 85.1, 110.1, 118, 54; 379/1, 9, 10, 12, 13, 14, 15, 16, 17, 53, 54, 92, 93, 94, 96, 112, 114, 120, 133, 202, 242, 243, 258, 268, 269; 340/825.03, 826, 825.06, 825.15; 358/84, 85

[56] References Cited

U.S. PATENT DOCUMENTS

| | | | |
|---|---|---|---|
| 4,529,840 | 7/1985 | Colton et al. | 379/54 |
| 4,694,452 | 9/1987 | Beckinger et al. | 370/58.2 |
| 4,771,419 | 9/1988 | Graves et al. | 370/58.3 |
| 4,839,916 | 6/1989 | Fields et al. | 379/13 |
| 4,887,076 | 12/1989 | Kent et al. | 370/58.1 |

Primary Examiner—Douglas W. Olms
Assistant Examiner—Alpus H. Hsu
Attorney, Agent, or Firm—Baker & Botts

[57] ABSTRACT

There is disclosed a system and method for controlling the cross connect fields of a multi-locational switched network from a single location under control of instructions from the end users. The different cross connect fields of the entire switched network are controlled in response to instructions received by the controller from each end user. The instructions specify the period of time when the end user desires to establish certain connections through the network and also specify the bandwidth required during that period of time. The controller preassigns certain channels of the internetwork links and at the designated time period the connections are established. The end user is billed only for the time the links were actually assigned.

66 Claims, 7 Drawing Sheets

CURRENT STATUS STATE DIAGRAM
1060

FIG. 10

ORIGINAL REQUEST DATA

| SCHEDULE ID | CIRCUIT ID | BANDWIDTH FACILITY CHANNELS | REQUEST DATE/TIME | START DATE/TIME | END DATE/TIME | CURRENT STATUS |
|---|---|---|---|---|---|---|
| 73 | ABC | M01_OFF 1-3<br>M11_J13 7-9<br>J06_OFF 18-20 | 01-MAR-1990 13:45 | 21-JUN-1990 11:00 | 23-JUN-1990 11:00 | PENDING     1009 |
| 80 | XYZ | F7_OFF 7<br>F9_G01 24<br>G16_M17 21<br>M12_OFF 1 | 12-MAR-1990 12:00 | 13-MAR-1990 00:00 | 13-MAR-1991 00:00 | ACTIVE     1010 |
| 113 | CKT01 | M01_OFF 6<br>M43_F72 7<br>F81_OFF 9 | 03-NOV-1989 06:45 | 01-JAN-1990 12:00 | 01-JUN-1990 13:00 | CANCELLED ← 1011<br>CANCEL DATE/TIME<br>06-DEC-1989 16:00 |
| 62 | ABC | M01_OFF 1-3<br>M14_G05 1-3<br>G63_J72 22-24<br>J06_OFF 18-20 | 01-DEC-1989 00:00 | 06-DEC-1989 00:00 | 16-DEC-1990 00:00 | CANCELLED ← 1011<br>CANCEL DATE/TIME<br>10-DEC-1990 16:00 |
| 111 | LA_SF | S14_OFF 1-24<br>S21_L72 1-24<br>L66_OFF 1-24 | 01-DEC-1989 00:00 | 01-JAN1990 11:00 | 01-FEB-1990 07:00 | EXPIRED     1013 | ns
NETWORK CONTROLLER SCHEDULING SYSTEM AND METHOD OF OPERATION

TECHNICAL FIELD OF THE INVENTION

This invention relates to connect cross-connect and more particularly to such networks in which end users can, for periods of time, schedule network capacity over pooled internetwork facilities.

CROSS REFERENCE TO RELATED APPLICATIONS

U.S. patent application Ser. No. 507,363, entitled "Network Controller Billing System and Method of Operation", filed concurrently herewith.

BACKGROUND OF THE INVENTION

There exists today massive national and international communication switch networks whereby an end user connected to one node can communicate to an end user, or to a particular internodal facility. These nodes or frames can be in the same office, across town, across a continent, around the world, and perhaps even in space.

These networks are constructed having having, at least one rearrangeable cross-connect field at each node. The cross-connect connect field operates under control of instructions from a network controller and serves to interconnect a plurality of end users to the internetwork communication links. The interconnections through the cross-connect field are semi-permanent in nature and can last for a single communication connection or can last for a period of time which may span several such connections.

End users can be permanently assigned certain link capacity on a cross-connect field or can share the capacity with other users of the same cross-connect field. This shared usage is called pooling. It is now common place for any one user to have facilities permanently assigned and to have additional periodic facility capacity by using the shared facility pool.

Within each internetwork link there are channels which can be used to establish communication connections. For certain types of communications more than one channel is necessary in order to establish the desired bandwidth capability. Usually, these channels must be contiguous in order to create the necessary band-width for a given communication connection. There are several such facilities interconnecting each network node and from any particular end user to any remote end user (or other communication facility, such as a computer) there could be many different links or paths. Thus, for a connection from one end user at a given node to another end user at a different network node there would be a choice of routes that could be established. Some of these routes are more cost effective than others.

Presently, when an end user who has access to a shared pool of facilities wishes to become connected to the pool, an attendant must communicate with the network manager and request the establishment of the proper connection. The network manager then assigns the proper routing (including the facilities and channels) to the end user for a particular period of time and establishes the connections required to affect the end to end circuit.

This arrangement is both time consuming and very inefficient from an attendant's point of view. In some situations, the use of pooled internodal facilities for short periods of time is not practical if an attendant must become involved. This is so for many reasons, one of which is the fact that often the desired use of the pooled facilities is for a short duration for the purpose of data transfer, which usually is scheduled to occur after normal hours and at other inconvenient times. Also, since a network serves many such end users, and since each end user has a number of different connection requests, the delay in central administration can become prohibitive.

Thus, a need exists in the art for a system in which a controller central to a plurality of network nodes can establish, on a timed basis, cross connections at the various nodes so that users sharing the internetwork facilities can have bandwidth established between any end points of the network for periods of time under control of the users.

A further need exists in the art for such a system which allows each end user sharing a common pooled set of communication facilities to schedule a series of timed connections through the entire network, from end point to end point, with each connection routing occurring at a particular given time. Such a system must also have the capability of determining the least cost prospective routing, verifying that the user in fact has allowance for using the requested facilities, for establishing the routing only for the proper period of time, and of supplying an audit trail for billing purposes.

SUMMARY OF THE INVENTION

These objectives, as well as others, have been achieved by a system and method of operation in which a multi-location switched network is established with a central controller which has access to all of the links of the system for the purpose of determining the busy-idle status of the links and for the purpose of monitoring the well-being of the links. Using this system, an end user at any node can log into the controller and can send instructions as to the bandwidth desired between nodes and the exact time that such bandwidth will be required.

In response to this information, the controller first determines that the end user, in fact, has authorization to use the requested bandwidth during the time of the requested period. Assuming this to be the case, then the controller looks for channels of the communication facilities between the end points requested which will be idle during the prospective time period. There may be several combinations of routings that could be scheduled and the controller, using a least cost algorithm, selects the most favorable path. Once the path is identified, then available bandwidth through the path must be selected and reserved. Once this is accomplished, the prospective routing is scheduled for use by the initiating end user during the requested time period.

At the scheduled period of time, or slightly therebefore, the controller begins an assessment of the continued availability of the previously selected channels to insure that quality communications will be possible during the scheduled period. Connections are then made through the various nodes at the proper time to insure that the end user has the requested bandwidth capability between the selected end point locations. A connection record is maintained giving the network manager billing information pertaining to the established time of the connection through the node as well as the time at which the reservation was made. In this manner, the user can be billed one rate for permission to use the pooled facilities, a second rate for the amount of time the facilities are reserved and a third rate for the time the facilities could have been used for actual communication by the end user.

In actual practice, the preassigned channels can be periodically reviewed to insure that the facilities are packed efficiently and that contiguous channels are used when necessary. This problem arises, for example, when a 24 channel facility is used and when an end user requires less than all of the channels. Other end users may be assigned some of the channels, depending upon their requirements. However, since reservations may change between the initial request from any end user until the actual time of usage, the channel allocation for a particular end user might change. The system accommodates this dynamic situation and changes the preassignment accordingly.

A least cost algorithm is used in the first instance to establish the proper routing for a prospective end user, and the channel assignments are based on this calculation. Changes, due to new requirements for channels, or due to transmission problems with the selected channels, can be accommodated.

Accordingly, it is a technical advantage of this invention to provide a scheduling and reservation system for a network of cross-connect fields, each field located at a node in a switched communication network.

It is a further technical advantage of this invention to provide a controller for controlling connections through one or more cross-connect frames or nodes, with at least one of the frames or nodes serving a plurality of different customers, and with the frames or nodes having a plurality of links for interconnecting the frames or nodes with another cross-connect network, the cross-connect frames or nodes each operable for establishing connections under control of the controller, for periods of time, where the controller receives instructions from any of the customers and keeps track of the present and the future status of the inter-nodal facilitates, reserves certain of the internodal facilities for fixed determined periods of time, and then establishes through the cross-connect network connections in accordance with the reserved facilities at the designated period of time.

BRIEF DESCRIPTION OF THE DRAWINGS

The foregoing objects, features and technical advantages, as well as others, of the invention will be more apparent from the following description of the drawings in which:

FIGS. 10-12 show scheduling and data base entries.

DETAILED DESCRIPTION OF THE INVENTION

Figure 1:
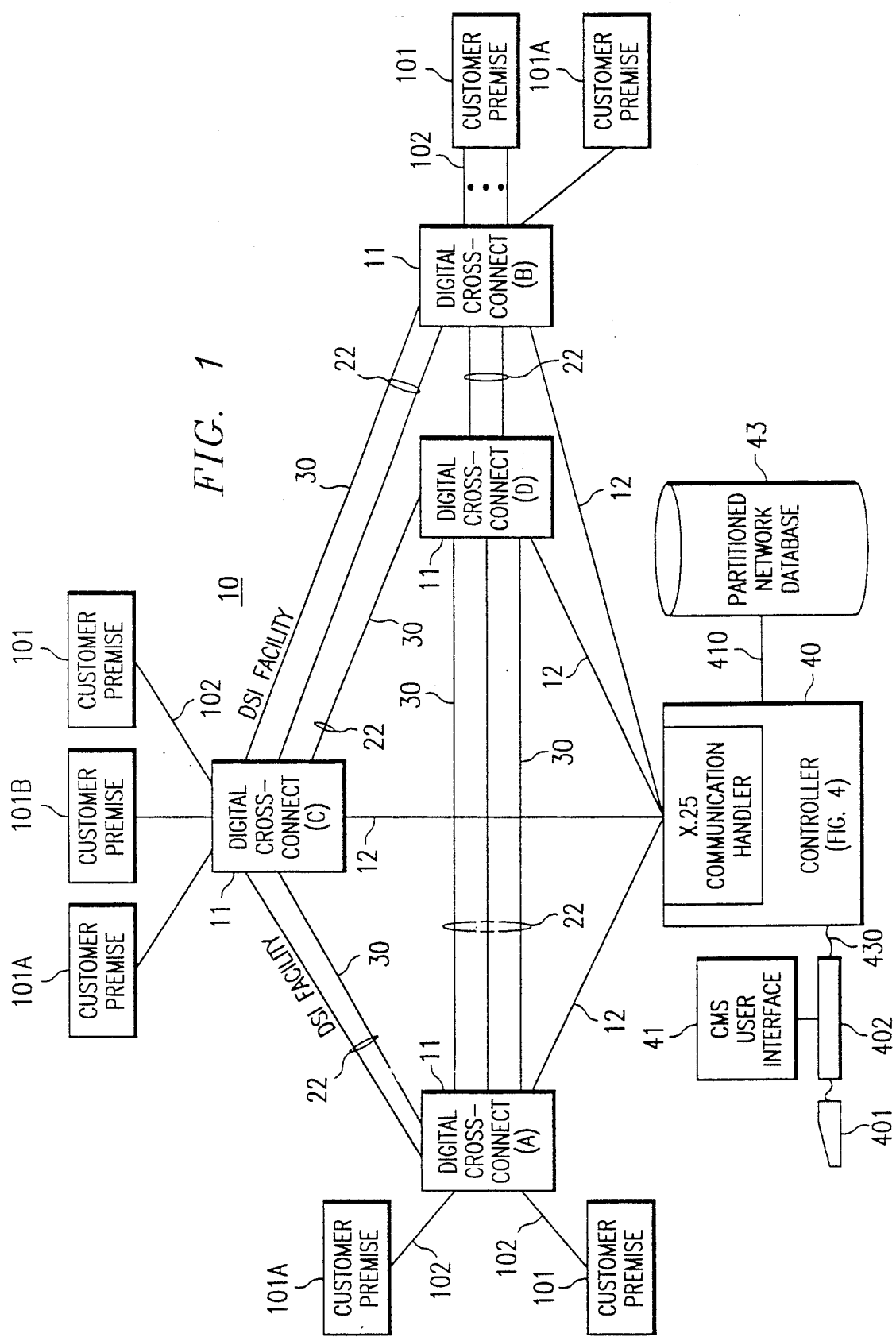
FIG. 1 is a block diagram of a cross-connect network showing the interaction with a schedule controller.

FIG. 1 is a block diagram of a cross-connect network 10 showing communication links 12 to controller 40 being able to communicate with each cross-connect 11 in the network. Controller 40 is the network controller which actually contains the software which allows user 41 to log into the system, provides communication links to each cross-connect in the network, and schedules connections and disconnections within the network. Controller 40 also has the routing ability to do routing from one customer premise location to another. The controller defines schedule conflicts in the network such that if a customer desires to set up a connection from one customer premise to another, the controller will determine what facilities 30 are going to be available during that time period and then stores the scheduled facilities in the data base. When the time comes to set up that connection, the controller will wake up, send the commands via connection 12 to the individual cross-connects 11 so that they will make the connections and effect the end-to-end circuit from one customer premise to another.

FIG. 1 shows network 10 which is comprised of a number of cross-connects 11. The cross-connects are connected by DS1 facilities 30. The DS1 facilities that connect to individual cross-connects 11 are pooled into links 22 so all the facilities between two cross-connects comprise links 22. Also shown are customer premise locations 101 which will connect to cross-connects 11 via lines 102. It should be noted that at any digital cross-connect 11 there can be any number of different customers 101, 101A, 101B connected via individual lines 102. Note also that the lines can be trunks or any other type of communication facility, digital or analog, and that line 102 represents a communication connection between customer premise 101 and cross-connect 11.

As a practical matter, line 102 would be divided into various sections and could in fact include the public switched network or a private network, and can, and most likely could, be digital with conversion to analog at some point. Of course, line 102 could be digital all the way through to the customer premise equipment. This equipment typically would be telephones, fax machines, or computers. Also, while a single line 102 is shown, these can be multiple lines.

Cross-connect 11 is a frame or a node in network 10 and can be a digital cross-connect node, as, for example, DSC DEXCS 1 or DSC DEXCS 1L. User interface 41 is the terminal that a customer would use to log in to controller 40. Interface 41 can be a VT 220 user terminal or it could be a PC workstation. Keypad 401 is the keyboard portion of the user interface terminal. System 402 is the controller of a PC used to interface with controller 40 via ethernet cable 430. This connection, of course, can be a dial-up type of connection into controller 40. Disk 43 contains the actual data description of the network controlled by controller 40 and is connected to the controller via interface 410.

Figure 2:
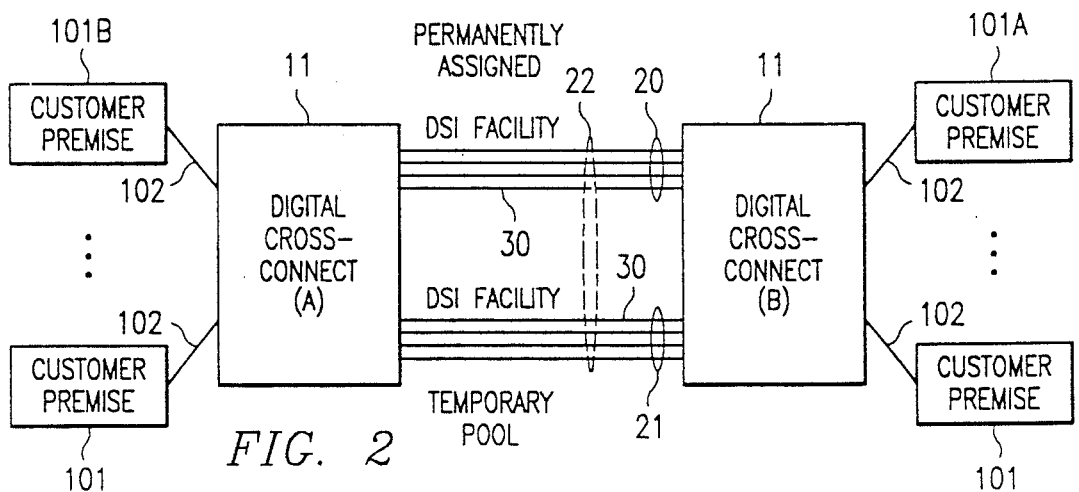
FIG. 2 shows details of the interconnect facility between cross-connect fields.

FIG. 2 is a blowup of a portion of FIG. 1 showing two digital cross-connects 11(A) and (B) connected by several DS1 facilities 30. Note that the DS1 facility 30 can be grouped into pools 20 and 21 where pool 20 is designated as part of the permanent pool while pool 21 is defined as belonging to the temporary pool. Pool 20 is available for permanent assignment to customers and pool 21 is available on a first-come first-serve basis to customers when they want to reserve capacity in the network. Link 22 is representative of the logical link between two digital cross-connects 11 where link 22 is defined as the total number of DS1 facilities 30 connecting two digital cross-connects.

Also connected to the digital cross-connects are a number of customer premise locations 101, 101A, 101B connected to the digital cross-connects via lines 102 where the lines 102 can be cross-connected to the DS1 facilities 30 within the digital cross-connect 11. In typical operation, customer premise 101 would have the same customer end-user at different nodes 11 as shown with respect to nodes A and B. Thus, as shown in FIG. 2, the same customer 101 is at both nodes 11 while customer 101B appears at one end of the nodes and 101A is a different customer end-user and appears at a different node. Typically, the system is designed so that the same customer appearing at different nodes can interconnect only between that customer and not with other customers.

Figure 3:
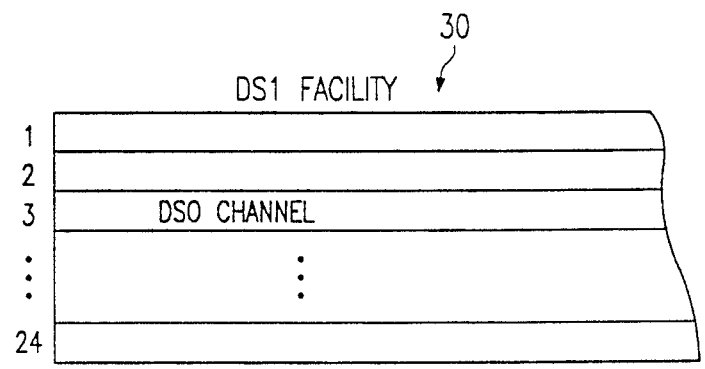
FIG. 3 shows the channels in a DS1 facility.

FIG. 3 is an expansion of DS1 facility 30 illustrating that a DS1 facility is composed of a number of DS0 channels. Packing of channels is a concept which allocates channels within a facility such that the facilities are not fragmented. For example, if a customer requires 3 channels of bandwidth on a facility, we look at all the facilities on a given link to get the customer from node A to node B. We then choose 3 channels of a given facility that are contiguous. In addition, we also choose the channels so that if a second customer requires channels, the ones already assigned will not be in the middle of a facility with spare capacity on each side. One customer will be given channels 1, 2 and 3. Another customer will be given channels 4, 5 and 6. Note that customer two was not assigned channels 6, 7 and 8 which would leave channels 4 and 5 empty and not available to another customer requiring three channels of contiguous bandwidth. Sometimes because of time differences in when the channels are being used, the facility becomes fragmented. In this situation, if possible, it is advantageous to rearrange the assignments of channels to maintain a packed facility.

In the diagram of FIG. 3 a DS1 facility is shown as being composed of 24 DS0 channels. This could also be generalized so a facility in broad terms contains any number of channels. For example, a DS3 facility would contain 28×24 DS0 channels.

Figure 4:
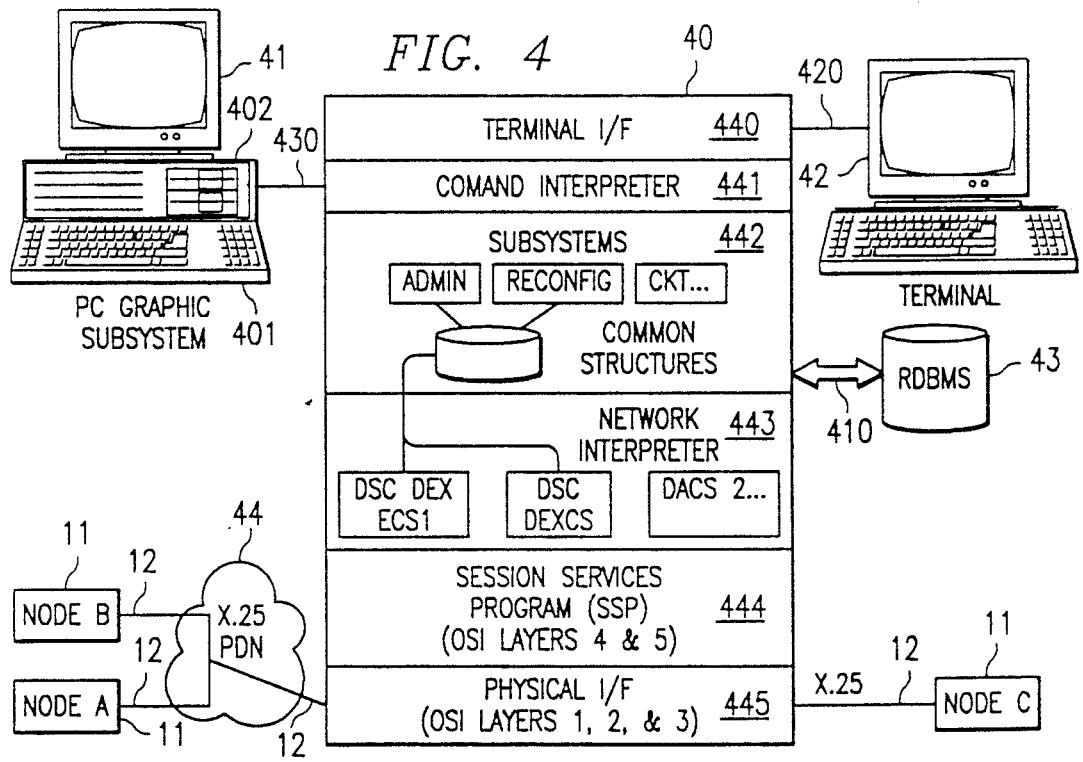
FIG. 4 shows a block diagram of the layers in the control program for setting up and controlling connections through the network.

FIG. 4 is an elaboration of FIG. 1 showing controller 40 connected to nodes A, B and C of cross-connect 11 via communication channels 12, which, for example, can be a ×0.25 protocol network 44. Channels 12 enter the controller at physical interface layer 445. Physical interface 445 is connected through session services program 444 and then through network interpreter 440 for different types of cross-connects and then to subsystems 442 to communication with the actual application control. Instructions from users 41 enter the system through command interpreter 441 either from a graphic workstation 41, 401, 402 via link 430 or from conventional terminal 42 via link 420 and interface 440. The applications are connected to data base 43 via interface 410.

Figure 5:
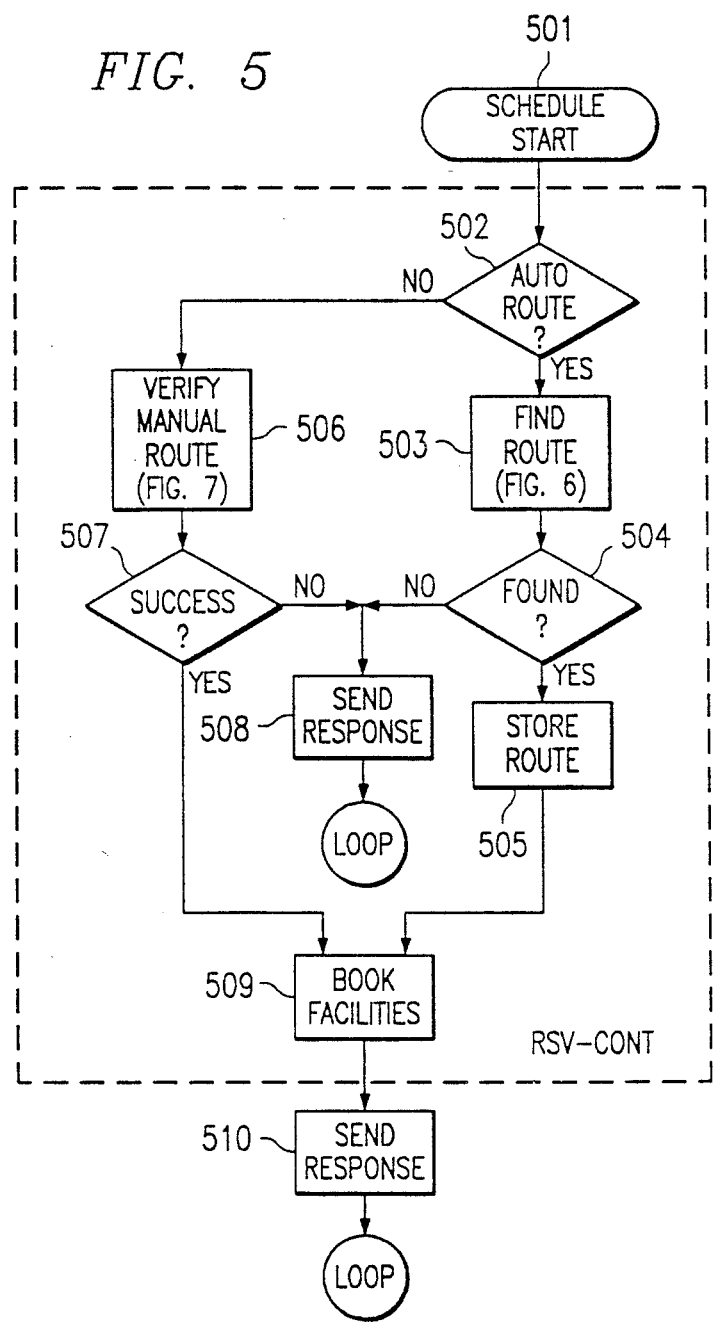
FIGS. 5-9 show subroutines for controlling scheduling in the network.

FIG. 5 describes one algorithm for processing an end user request to schedule a circuit for connection. Starting out at box 501, the system looks at the circuit that the user is requesting to schedule for connection. A determination is made as to box 502 as to whether or not auto routing is required. If the circuit is to be auto routed, meaning the end user has not defined a route for the circuit, then the system proceeds, box 503, to find a route for the circuit. This operation will be described hereinafter with respect to FIG. 6. Assuming now that a route is found and the system proceeds, box 504, to store the route, box 505, in the data base. The system books the facilities, box 509, that are part of the circuit's route. Booking means that the system stores in the data base what facilities (channels) are going to be used, the time-frame they are going to be used, and the circuits with which they are associated. Box 510 then sends an appropriate response to the user.

Assume now that a manual route is to be employed. This is determined by box 502. This means that the end user has manually defined a route to be used for that circuit. That route is verified as controlled by box 506 which will hereinafter be described with respect to FIG. 7. The system must verify that the user defined manual route is going to be available in the designated time period. If the route is available, as shown in box 507, then the system books those facilities via box 509, as discussed above. An appropriate response is returned to the user.

If the facilities are not going to be available, a different response, box 508, is returned to the user indicating that the desired route cannot be scheduled for that time period because some of the facilities are already booked.

Returning again to box 502, when an auto route request is made, there are tables stored in data base 43 (FIG. 1), that provide the definition of the circuit and whether there is a route stored for that circuit. This same data base is used to determine whether the facilities in a manually provided route are available during the designated time period. In general then, there are tables in data base 43 that define what facilities are booked for what periods of time. By looking in those tables, the system can determine whether the facilities that are part of a circuit's route are available during a time period requested. In operation, the system stores the route information in the data base in a table and defines it as a route for the circuit associated with this schedule. The system also takes the facilities stored in that route and defines them as booked for the time period. In this manner complete control of the system is maintained without regard to where the actual physical facilities are located.

Figure 6:
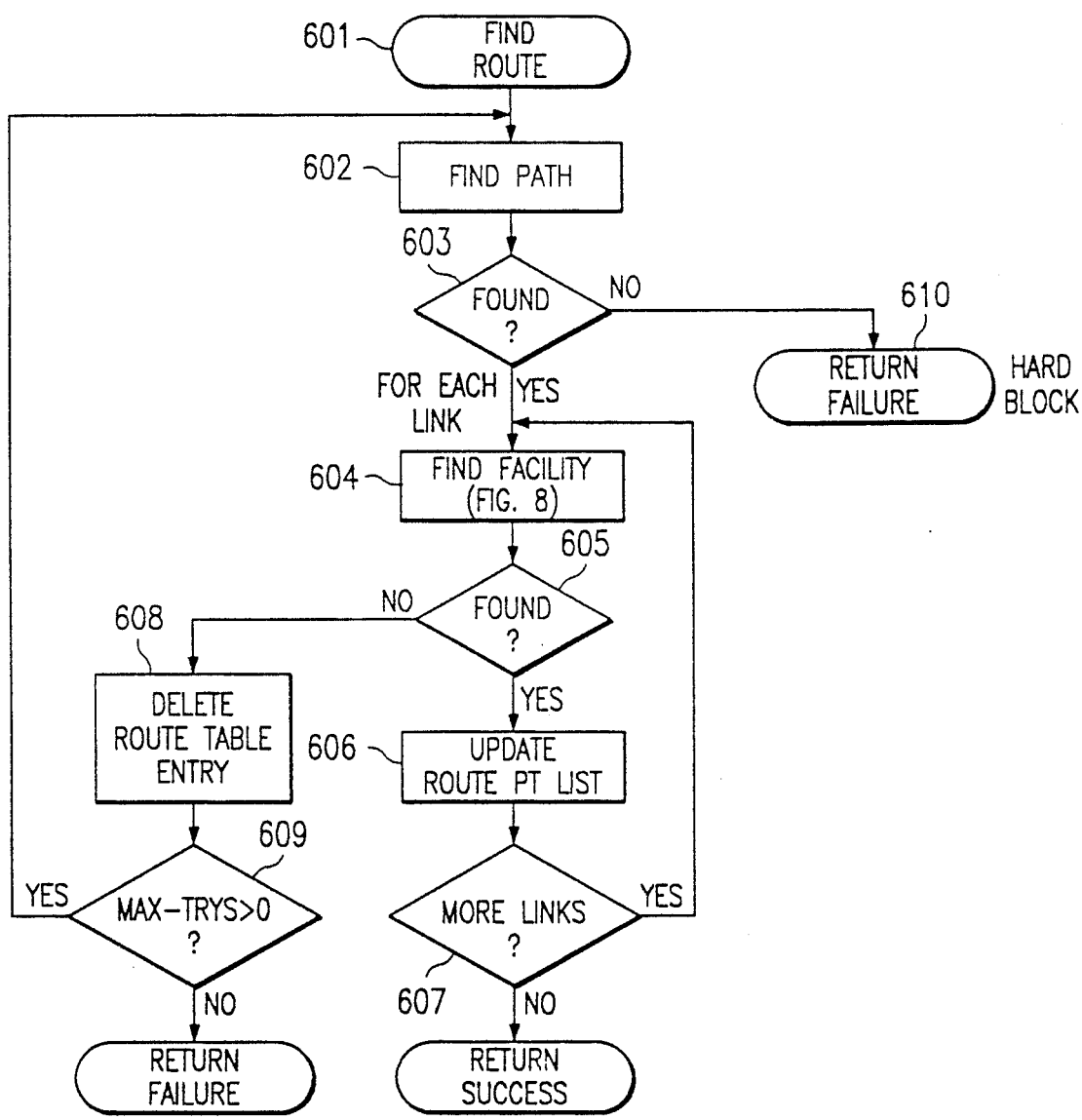

Continuing now in FIG. 6, there is shown the algorithm used by the system for finding a route, box 601 for a circuit. The first step in finding a route is box 602, where the system finds a path, which will be recalled from FIG. 1, is a list of links from one customer premise location to another customer premise location. Find path, box 602, uses an algorithm where it uses "weighting" factors on links and determines the least cost based on the weight factors to get from one end point cross-connect frame to another end point cross-connect frame. If the auto routing algorithm finds a path, box 603, then for each link in that path a facility will be found, box 604. The algorithm for finding a facility will be described with respect to FIG. 8.

If the system finds a facility, then that facility is added to data base 43, as discussed. The system then continues on to the next link. The facility for the next link, if it's found, is also stored in data base 43. The system continues until it gets to a link for which it cannot find an available facility. The system then goes back to data base 43, deletes the route that has been stored and then goes back to box 602. The system then must find another path to get from the first input cross-connect to the end input cross-connect because the first desired set of links is at a particular link. The system selects another path that excludes the blocked link and starts over again. The system continues this iterative loop until it finds a facility for each link of the path which will be available at the proper time. When this occurs, box 606 updates the route to be stored in data base 43. Since all links have been selected, the system is successful.

If on the other hand, the system continues to find unavailable links and exhausts its links, and if it has reached a maximum number of attempts, box 604, it determines that it is hard blocked and returns a failure indication.

Figure 7:
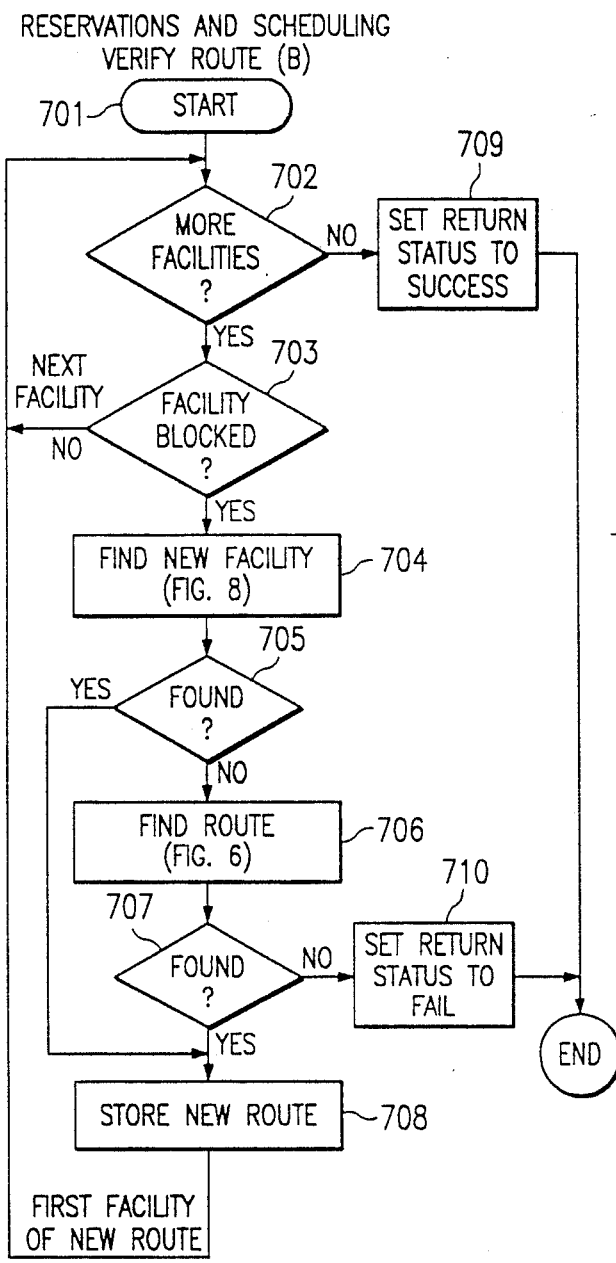

FIG. 7 is the algorithm for verifying the availability of the capacity in a previously defined route. The route was previously stored in data base 43, and the system goes to the data base, pulls out the route that was defined for that circuit, and, for every facility in that circuit's route, goes to box 703 to determine whether the facility is blocked or available. To determine whether a given facility is blocked, the system uses data base 43, as discussed above to see if this facility is available during the desired time period. If the facility is not blocked, the system goes back to the circuit route, obtains the next facility in that circuit's route, and checks whether that next facility is blocked. This is continued until the system is through with all the facilities. If none of the links are blocked, then box 709 returns a success indication that the predefined route is verified to be available during the time period requested.

However, if during this loop when the system is testing the facilities to see whether they are blocked, it encounters a facility that is blocked or unavailable for some reason during the time period requested, then the system goes to box 704 to find a new facility for this link. This operation will be hereinafter described with reference to FIG. 8. Continuing now with box 705, if the system finds a new facility, it updates the route that was stored in data base 43 by substituting the new facility for this link. The system then goes back and starts over at the beginning to verify this new circuit route.

If however, the system is not able to find a new facility, it goes to box 706 and tries to find an auto route for the circuit. If a route is found, the new route is substituted in the list and the verification process begins again via box 706. If, however, this avenue is exhausted, then boxes 707 and 710 control a failure indication to the user.

Figure 8:
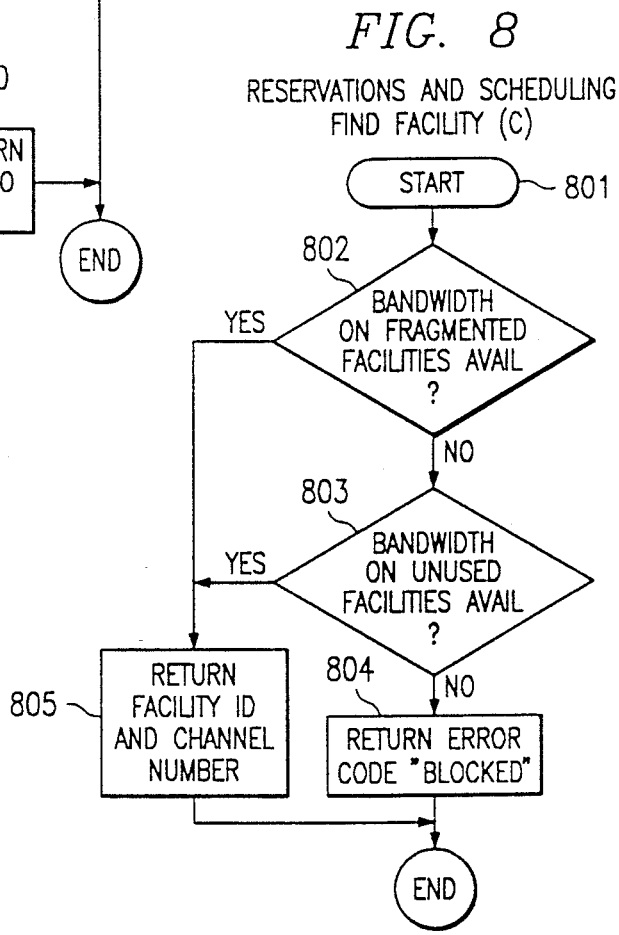

FIG. 8 shows one algorithm, referred to previously, for finding a facility and/or channels on a given link. For a particular link, the system must determine the bandwidth needed and also determine where that bandwidth can be found. The system looks for bandwidth box 802, on fragmented facilities to see if bandwidth is available on facilities that already have some capacity scheduled. If there is capacity on one of those fragmented facilities, then the system is finished, box 805, and the system returns the facility ID and the channel number.

If, however, the system was unable to find available band-width on a fragmented facility, then it will go to data base 43 and search, box 803, for bandwidth on a facility that has no channels booked thereon. If this is found, then this operation is finished and box 805 returns the identity of that facility and channel number. If the system is unable to find bandwidth on an unused facility, then box 804, returns an error.

Figure 9:
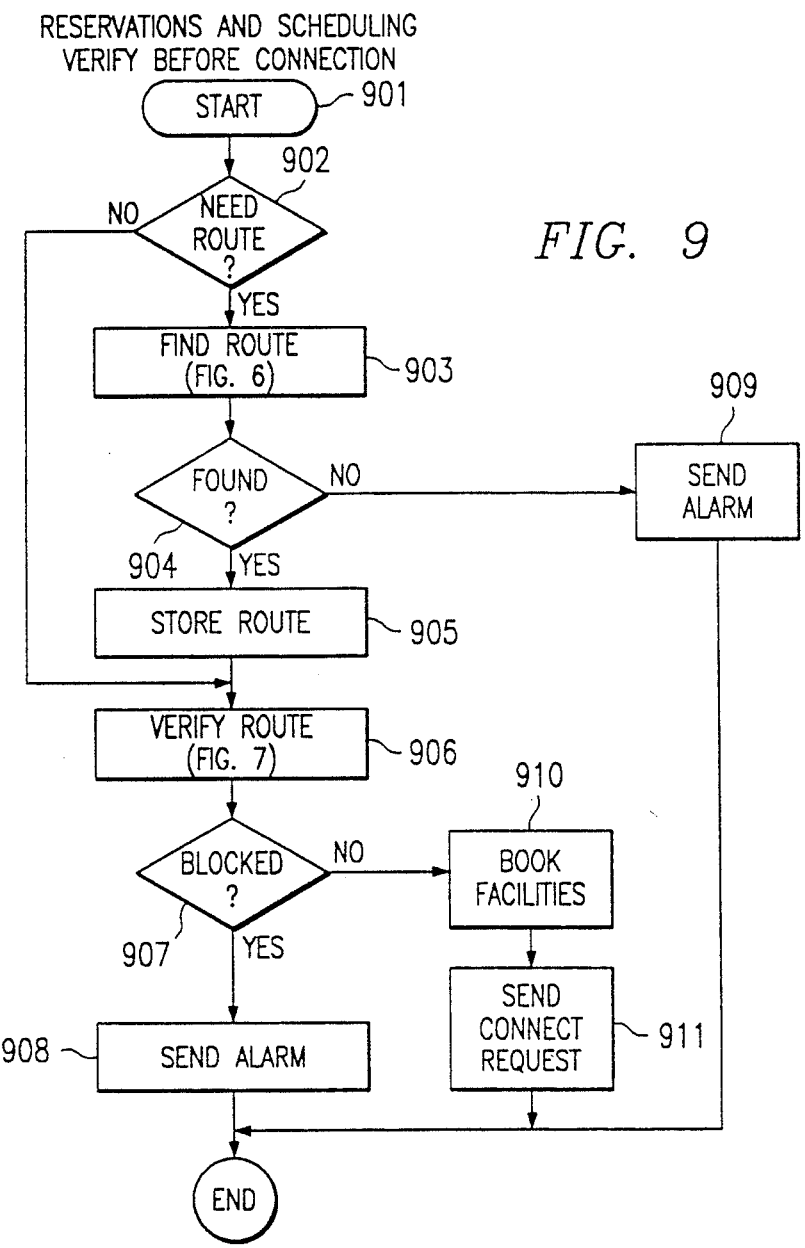

FIG. 9 describes an algorithm used to verify a previously requested schedule request just prior to connection. Before the circuit is ready to be connected, the system verifies that the circuit's route is still available for connection. Starting with box 902, if a circuit that is stored in data base 43 and is scheduled for connection needs a route defined for it, then that route is found by box 903 as previously described with respect to FIG. 6. This could happen, for example, if the system had stored a request that didn't have any route associated therewith because there were none available at the time the circuit was first identified. When the system wakes up and determines that it is time to connect that circuit, it then looks for a route.

Assuming that a route has been stored and box 906 verifies the route, then the system would remove the route information from data base 43 and the system is verified as previously discussed with respect to FIG. 7. One of the inputs to FIG. 7 is whether the system desires to check to see if the facilities will be available in the figure, or whether the system desires to check the dynamic alarm status of the facilities for immediate connection. Thus, in addition to checking that the facilities are not booked by someone else, the system will verify that the facilities are not in an alarm condition or for some other reason unavailable. If the desired routing is not blocked, the system books the facilities and sends a connect request to all of cross-connects to connect up the circuit. If the route is blocked, then the system notifies the users that the desired connection cannot be established.

It should be noted that many degrees of sophistication can be employed in his system. For example, if a circuit is stored for which routes are determined to be unavailable, then the system can be set if desired, to wake up periodically and attempt to assign specific routes. The user administration can be notified when a routing has become available and billing can be measured depending upon the actual connection time, as well as upon the actual time of the prereservation.

FIG. 10 shows a sample of an original request data entry in data base 43. The system provides billing data by 1) storing information about the original schedule request 1001; 2) maintaining a current status of each schedule request 1008; and 3) storing information about the actual connection and disconnection of the circuit associated with the original schedule request 1050 (FIG. 12).

The original request data 1001 includes, for each schedule request, a unique schedule identifier 1002, the circuit identifier of the scheduled circuit 1003, the bandwidth reserved for the schedule request 1004, the date and time the original schedule request was received 1005, the requested starting date and time of the schedule request 1006. The starting time is the time the circuit is to be connected through the switched network. Also included in original request data 1001 is the requested ending date and time of the schedule request 1007. The end date/time is the time the circuit is to be disconnected.

Figure 11:
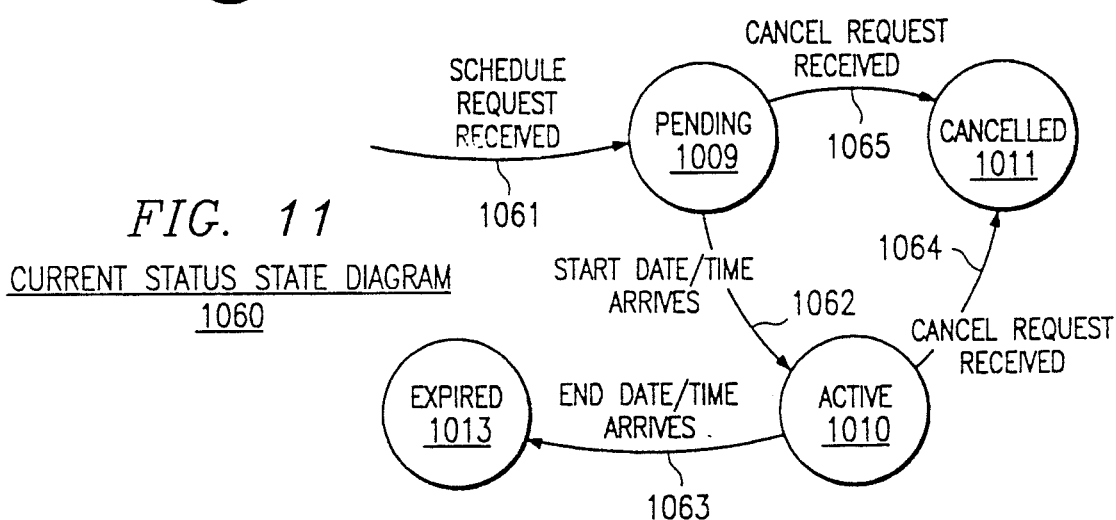

FIG. 11 shows current status state diagram 1060 which defines the valid status values of a schedule request. Current status 1060 of a schedule request may be pending 1009, meaning the start date/time 1006 of the schedule request has not yet been reached, i.e., it is pending connection. Current status 1060 may be active 1010, meaning the start date/time 1006 of the schedule request has arrived and the circuit is connected. Current status 1060 may be expired 1013, meaning the end date/time 1007 of the schedule request has arrived. Current status 1060 may also be cancelled 1011, in which case a cancelled date/time is stored.

FIG. 12 shows one sample of connect data 1050 including, for each schedule request, schedule identifier 1002, the date and time the circuit was actually connected through the switched network 1051 and the date and time the circuit was actually disconnected 1052.

As shown in FIG. 11, when the schedule request received 1061 action occurs, data in original request data 1001 table is recorded. This includes schedule ID 1002, circuit ID 1003, bandwidth 1004, request date/time 1005, start date/time 1006 and end date/time 1007. Current status 1060 of the schedule request is set to pending 1009.

When start date/time arrives 1062 for a schedule request in pending 1009 state, a connect date/time 1051 is recorded in connect data 1050 and current status 1060 of the schedule request is set to active 1010 state.

When a cancel request received 1065 action occurs for a schedule request which is in pending 1009 state, a cancelled date/time 1012 is recorded for the schedule request, and the current status 1060 of the schedule request is set to cancelled 1011 state.

When a cancel request received 1065 action occurs for a schedule request which is in active 1010 state, a cancelled date/time 1012 is recorded for the schedule request, a disconnect date/time 1052 is recorded in connect data 1050 and current status 1060 of the schedule request is set to cancelled 1011 state.

When an end date/time arrives 1063 action occurs for a schedule request which is in active 1010 state, a disconnect date/time 1052 is recorded in connect data 1050 and the current status 1060 of the schedule request is set to expired 1013 state.

Although the present invention has been described with respect to a specific preferred embodiment thereof, various changes and modifications may be suggested by one skilled in the art, and it is intended that the present invention encompass such changes and modifications as fall within the scope of the appended claims.

We claim:

1. A controller for controlling connections through two or more cross-connect nodes, with at least one of said nodes serving a plurality of different customers, each customer having one or more lines associated therewith and connected to said one node, said one node having a plurality of internodal links for interconnecting said cross-connect node with another cross-connect node to form a network of nodes, said cross-connect node to form a network of nodes, said cross-connect nodes each operable for establishing connections under control of said controller, for periods of time, from selected lines associated with selected ones of said customers to certain of said internodal links, said controller comprising:

means for receiving instructions from any of said customers;

means for monitoring the scheduled use of said internodal links;

means controlled jointly by received instructions from one of said customers and by said monitoring means for reserving certain of said internodal links for selected lines of said one customer for fixed determined periods of time; and means controlled by said reserving means for establishing through said network connections from said one customer's selected lines to said reserved links at said designated period of time.

2. The controller set forth in claim 1 wherein said lines associated with any one customer can be connected to any said cross-connect node.

3. The controller set forth in claim 2 further comprising:

means for preventing the establishment of network connections between lines serving different customers.

4. The controller set forth in claim 1 further comprising:

means controlled by said reserving means for removing said established network connections to said reserved links at the expiration of said reserved period of time.

5. The controller set forth in claim 4 wherein some of said links of said network are dedicated to certain of said customers and wherein certain of said links are pooled between said customers and wherein said reserved links are within said pool.

6. The controller set forth in claim 5 further comprising:

means for associating each of said customers with certain network link capacity, and wherein said reserving means includes:

means for checking said associating means to determine the validity of any customer instruction.

7. The controller set forth in claim 1 wherein said reserving means includes:

means enabled by a received instruction from a customer pertaining to a desired internodal connection at a future period of time for identifying a proposed series of internodal facilities which will be available during said period of time and which have not been reserved for use by any other customer; and means for storing said identified facilities until said designated period of time.

8. The controller set forth in claim 7 wherein said identifying means includes:

means for determining which routing will be the most cost effective for said customer at said designated period of time.

9. The controller set forth in claim 8 wherein said establishing means includes:

means operative at said designated reserved period of time for obtaining said stored identified facilities, and second means for determining the continued availability of said stored identified facilities.

10. The controller set forth in claim 9 wherein said establishing means further includes:

means operative upon a determination of non-availability of any of said facilities for establishing a new set of facilities for connection at said designated period of time.

11. The controller set forth in claim 9 wherein said second determining means is operative at a period of time just prior to said designated period of time.

12. The controller set forth in claim 1 wherein said establishing means includes:

means for periodically checking to see if any internodal connections are reserved for establishment during a next block of time, means for initiating said connection establishment for any reserved facilities prior to the actual reserved time; and means for providing billing information concerning the time of establishment of each of said facilities, said billing information including a starting time corresponding to the reserved period of time without regarding any early facility establishment.

13. The controller set forth in claim 1 wherein said internodal links each has a plurality of subchannels and wherein said establishing means further includes:

means for determining the prospective idle condition of each channel within each link at said predetermined time; and means for preassigning contiguous channels to the same customer in an orderly manner so as to achieve optimum packing of the subchannels during the designated connection period.

14. The controller set forth in claim 13 further comprising:

means operative prior to the actual connection period for reviewing said preassignment of subchannels to a particular customer and for establishing a new assignment if necessary for continued optimum packing.

15. The controller set forth in claim 1 wherein said reserving means includes:

means enabled by a received instruction from a customer pertaining to a desired internodal connection at a future period of time for identifying a proposed series of internodal facilities to be used during said period of time;

means for storing said proposed series of facilities;

means prior to said period of time for retrieving said stored proposed series of facilities and for reserving said retrieved facilities for use at said future period of time by said customer; and means for storing said reserved facilities until said designated period of time.

16. The controller set forth in claim 15 wherein said identified proposed series of internodal facilities are selected automatically by said controller.

17. The controller set forth in claim 15 wherein said identified proposed series of internodal facilities are identified by said customer.

18. A network controller for use in a switched network having a plurality of nodes, each node having at least one remotely programmable cross connect field, said nodes having internodal communication links between them and at least some of said nodes having end user communication equipment connected to them, each said link containing one or more channels and wherein said end users can communicate over said links to and from a plurality of end user communication equipment connected to various ones of said nodes, and wherein each said cross connect field is programmable to establish communication paths to other cross-connect fields over communication selected channels of said links and from selected end users to said selected channels of said links, said network controller comprising:

means for receiving instructions from said end users pertaining to said communication equipments at certain of said nodes which are desired to be in a communicating relationship during certain defined time periods, said instructions including the desired band-width capacity of each of said relationships, and means for preassigning channels of said links between the proper nodes for each said end user instruction on a first instruction received first preassigned basis, all for connection at said certain end user defined period of time.

19. The controller set forth in claim 18 further comprising:

means operative at each said defined period of time for establishing said preassigned desired communication relationships for each said end user using said preassigned channels.

20. The controller set forth in claim 19 further comprising:

means at each said defined period of time for ascertaining the continued validity of said preassigned channels; and means for changing said preassigned channels under control of said continued validity ascertaining means.

21. The controller set forth in claim 20 further comprising:

modifying means operative prior to said predetermined period of time with respect to any said end user for changing said preassigned channels.

22. The controller set forth in claim 21 wherein said modifying means is operative in response to further instructions from said end user.

23. The controller set forth in claim 22 wherein said modifying means is further operative in response to said continued validity of one or more of said preassigned channels.

24. The controller set forth in claim 21 wherein each said link includes one or more communication facilities and wherein said preassigning means includes:

means for packing said channels of said facilities in an efficiently packed manner to utilize the full bandwidth capacity of each of said facilities, wherein the band-width of each said end user instruction utilizes contiguous channels of the same facility.

25. The controller set forth in claim 24 wherein said modifying means is further operative in response to a reordered packing of said channels of said facilities of said links, while still maintaining said contiguous channel relationship for any end user instruction.

26. The controller set forth in claim 24 wherein some of said facilities of said network are dedicated to certain of said end users and wherein certain of said facilities are pooled between said end users and wherein said reserved links are within said pool.

27. The controller set forth in claim 19 further comprising:

means controlled by said reserving means for removing said established network connections to said reserved links at the expiration of said reserved period of time.

28. The controller set forth in claim 20 wherein said establishing means includes:

means for ascertaining the validity of any customer instruction with respect to preestablished network bandwidth.

29. The controller set forth in claim 28 wherein said preassigning means includes:

means enabled by a received instruction from an end user pertaining to a desired internodal connection at a future period of time for identifying a proposed series of internodal links and channels thereof which will be available during said period of time and which have not been previously reserved for use by any end user; and means for storing said identified channels of said identified links until said designated period of time.

30. The controller set forth in claim 29 wherein said identifying means includes:

means for determining which link routings will be the most cost effective for said end user at said designated period of time.

31. The controller set forth in claim 30 wherein said establishing means includes:

means operative at said designated reserved period of time for obtaining said stored identified channels; and means for determining the continued availability of said stored identified links.

32. The controller set forth in claim 19 wherein said establishing means includes:

means for periodically checking to see if any internetwork connections are preassigned for establishment during a next block of time;

means for initially said channel establishment of any preassigned channels prior to the actual reserved time; and means for providing billing information concerning the time of establishment of each of said channels, said billing information including a starting time corresponding to the preassigned period of time without regarding any early channel establishment.

33. A switched network having a plurality of nodes, each node having at least one remotely programmable cross connect field, said nodes having internodal communication links between them and at least some of said nodes having end user connections connected to them, each said link containing one or more channels and wherein said end users can communicate via said end user connections over said links to and from a plurality of end user connections associated with various ones of said nodes, and wherein each said cross connect field is programmable to establish communication paths from selected end user connections to selected channels of said links, said network comprising:

means for receiving instructions from said end users pertaining to end user connections at certain of said nodes which are desired to be in a communicating relationship during certain defined time periods, said instructions including the desired band-width capacity of each of said relationships; and means for preassigning channels of said links between the proper nodes for each said end user instruction on a first instruction received first preassigned basis, all for connection at said certain end user defined period of time.

34. The network set forth in claim 33 further comprising:

means operative at each said defined period of time for establishing said preassigned desired communication relationships for each said end user using said preassigned channels.

35. The network set forth in claim 34 further comprising:

means at each said defined period of time for ascertaining the continued validity of said preassigned channels; and means for changing said preassigned channels under control of said continued validity ascertaining means.

36. The network set forth in claim 35 further comprising:

modifying means operative prior to said predetermined period of time with respect to any said end user for changing said preassigned channels.

37. The network set forth in claim 36 wherein said modifying means is operative in response to further instructions from said end user.

38. The network set forth in claim 37 wherein said modifying means is further operative in response to ascertained problems with respect to one or more of said preassigned channels.

39. The network set forth in claim 38 wherein each said link contains one or more communication facilities and wherein said preassigning means includes:

means for packing said channels of said facilities in an efficiently packed manner to utilize the full bandwidth capacity of each of said facilities, wherein the band-width of each said end user request utilizes contiguous channels of the same facilities.

40. The network set forth in claim 39 wherein said modifying means is further operative in response to a reordered packing of said channels of said links, while still maintaining said contiguous channel relationship for any end user request.

41. A method of controlling connections through two or more cross-connect networks, with at least one of said networks serving a plurality of different customers, each customer having one or more lines associated therewith and connected to said one network, said one network having:

a plurality of links for interconnecting said cross-connect network with another cross-connect network, said cross-connect networks each operable for establishing connections under control of said network, for periods of time, from selected lines associated with selected ones of said customers to certain of said inter-network links;

said method comprising the steps of:

receiving instructions from any of said customers;

monitoring the status of said inter-network links; and reserving, under joint control of received instructions from one of said customers and said monitoring status, certain of said inter-network links for selected lines of said one customer for fixed determined periods of time.

42. The method set forth in claim 41 further comprising the step of:

establishing, under control of said reserving step, through said cross-connect network connections from said one customer's selected lines to said reserved links at said designated period of time.

43. The method set forth in claim 42 further comprising the steps of:

removing said established network connections to said reserved links at the expiration of said reserved period of time.

44. The method set forth in claim 43 wherein some of said links of said network are dedicated to certain of said customers and wherein certain of said links are pooled between said customers and wherein said reserved links are within said pool.

45. The method set forth in claim 42 further comprising the steps of:

associating each of said customers with certain network link capacity, and wherein said reserving steps includes the step of:

checking said associations to determine the validity of any customer instruction.

46. The method set forth in claim 41 wherein said reserving step includes the steps of:

identifying, for each received instruction from a customer pertaining to a desired inter-network connection at a future period of time, a proposed series of internetwork links which will be available during said period of time and which have not been reserved for use by any other customer; and storing said identified links until said designated period of time.

47. The method set forth in claim 46 wherein said identifying step includes the step of:

determining which links will be the most cost effective for said customer at said designated period of time.

48. The method set forth in claim 45 wherein said establishing step further includes the steps of:

obtaining, at said designated reserved period of time, said stored identified links; and determining the continued availability of said stored identified links.

49. The method set forth in claim 42 wherein said establishing step further includes the step of:

establishing a new set of links for connection at said designated period of time upon a determination of non-availability of any of said links.

50. The method set forth in claim 47 wherein said determination of continued availability step is operative at a period of time just prior to said designated period of time.

51. The method set forth in claim 42 wherein said establishing step includes the steps of:

periodically checking to see if any internodal connections are reserved for establishment during a next block of time, initiating said link establishment for any reserved links prior to the actual reserved time; and providing billing information concerning the time of establishment of each of said links, said billing information including a starting time corresponding to the reserved period of time without regarding any early link establishment.

52. The method set forth in claim 42 wherein said interlinks each have a plurality of subchannels and wherein said establishing step further includes the steps of:

determining the prospective idle condition of each channel within each link at said predetermined time; and preassigning contiguous channels to the same customer in an orderly manner so as to achieve optimum packing of the subchannels during the designated connection period.

53. The method set forth in claim 42 further comprising the steps of:

reviewing, prior to the actual connection period, said preassignment of subchannels to a particular customer and for establishing a new assignment if necessary for continued optimum packing.

54. A method for use in a switched network having a plurality of nodes, each node having at least one remotely programmable cross connect field, said nodes having communication links between them and at least some of said nodes having end user facilities connected to them, each said link containing one or more channels and wherein said end users can communicate over said links to and from a plurality of communication facilities connected to various ones of said nodes, and wherein each said cross connect field is programmable to establish communication paths from selected facilities to selected channels of said links and from selected end users to selected channels of said links, said method comprising the steps of:

receiving instructions from said end users pertaining to facilities or other end users at certain of said nodes which are desired to be in a communicating relationship therewith during certain defined time periods, said instructions including the desired band-width capacity of each of said relationships; and preassigning channels of said links between the proper nodes for each said end user instruction on a first instruction received first preassigned basis, all for connection at said certain end user defined period of time.

55. The method set forth in claim 54 further comprising the step of:

establishing at each said defined period of time said preassigned desired communication relationships for each said end user using said preassigned channels.

56. The method set forth in claim 55 further comprising the steps of:

ascertaining at each said defined period of time the continued validity of said preassigned channels, and changing said preassigned channels under control of said ascertained continued validity.

57. The method set forth in claim 56 further comprising the step of:

modifying said preassigned channels prior to said predetermined period of time with respect to any said end user.

58. The method set forth in claim 57 wherein said modifying step is operative in response to further instructions from said end user.

59. The method set forth in claim 58 wherein said modifying step is further operative in response to ascertained problems with respect to one or more of said preassigned channels.

60. The method set forth in claim 59 wherein said preassigning step includes the step of:

packing said channels of said links in an efficiently packed manner to utilize the full band-width capacity of each of said links, wherein the band-width of each said end user request utilizes contiguous channels of the same link.

61. The method set forth in claim 60 wherein said modifying step is further operative in response to a reordered packing of said channels of said links, while still maintaining said contiguous channel relationship for any end user request.

62. The method set forth in claim 55 further comprising the step of:

removing said established network connections to said reserved links at the expiration of said reserved period of time.

63. The method set forth in claim 54 wherein some of said links of said network are dedicated to certain of said end users and wherein certain of said links are pooled between said end users and wherein said reserved links are within said pool.

64. The method set forth in claim 55 wherein said establishing step includes the step of:

ascertaining the validity of any customer instruction with respect to preestablished network bandwidth.

65. The method set forth in claim 54 wherein said preassigning step includes the steps of:

identifying, under control of a received instruction from an end user pertaining to a desired inter-network connection at a future period of time, a proposed series of inter-network links and channels thereof which will be available during said period of time and which have not been reserved for use by any other end user; and storing said identified channels of said identified links until said designated period of time.

66. The method set forth in claim 55 wherein said establishing step includes the steps of:
periodically checking to see if any inter-method connections are preassigned for establishment during a next block of time;
initiating said channel establishment for any preassigned channels prior to the actual reserved time; and
providing billing information concerning the time of establishment of each of said channels, said billing information including a starting time corresponding to the preassigned period of time without regarding any early channel establishment.

* * * * *

UNITED STATES PATENT AND TRADEMARK OFFICE
CERTIFICATE OF CORRECTION

PATENT NO. : 5,065,392

DATED : November 12, 1991

INVENTOR(S) : Marcille Sibbitt, et al.

It is certified that error appears in the above-identified patent and that said Letters Patent is hereby corrected as shown below:

```
Column 1, line  6, after "to" delete "connect";
          line 24, delete "having,", second occurrence.
          line 26, after "cross-connect" delete "connect".
          line 46, change "band-width" to --bandwidth--.
Column 7, line 53, change "band-width" to --bandwidth--.
Column 9, line 44, delete in its entirety.
Column 12, line 64, "link routings" should be --link routing--.
```

Signed and Sealed this

Fifth Day of October, 1993

Attest:

BRUCE LEHMAN

Attesting Officer

Commissioner of Patents and Trademarks